N. D. Hinman,
Hay Elevator,
N° 70,717. Patented Nov. 12, 1867.

Witnesses.
A. J. Tibbits
John D. Thurman

Inventor,
N. D. Hinman.
By his Attorney
Thos. E. Earl

AM. PHOTO-LITHO. CO. N.Y. (OSBORNE'S PROCESS)

United States Patent Office.

N. D. HINMAN, OF STEPNEY DEPOT, CONNECTICUT.

Letters Patent No. 70,717, dated November 12, 1867.

IMPROVEMENT IN CLUTCH FOR HAY-ELEVATORS.

*The Schedule referred to in these Letters Patent and making part of the same.*

TO ALL WHOM IT MAY CONCERN:

Be it known that I, N. D. HINMAN, of Stepney Depot, in the county of Fairfield, and State of Connecticut, have invented a new Improvement in Clutch for Hay-Elevators.; and I do hereby declare the following, when taken in connection with the accompanying drawings, and the letters of reference marked thereon, to be a full, clear, and exact description of the same, and which said drawings constitute part of this specification, and represent, in—

Figure 1:
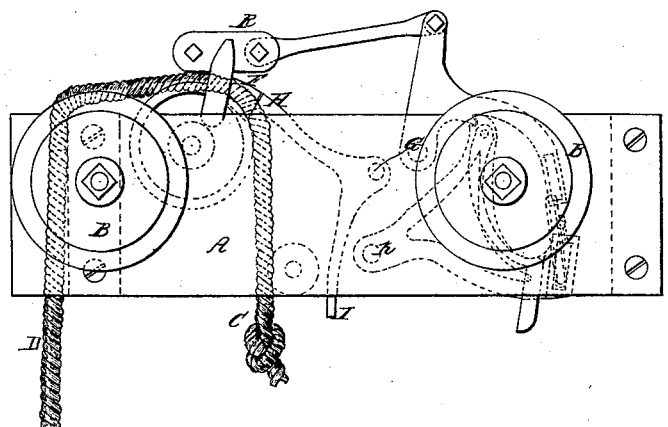

Figure 1, a side view, and in

Figure 2:
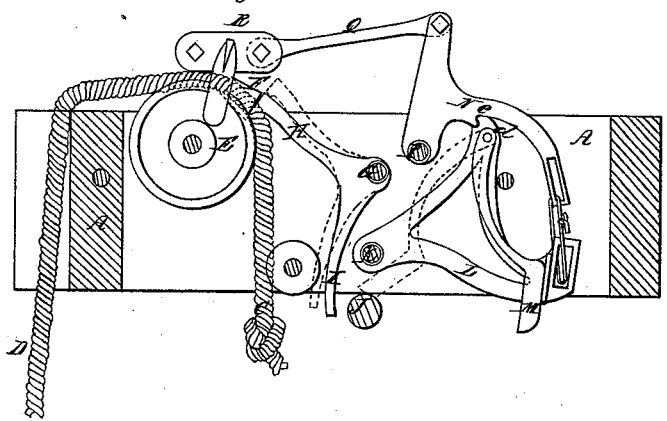
Figure 3:
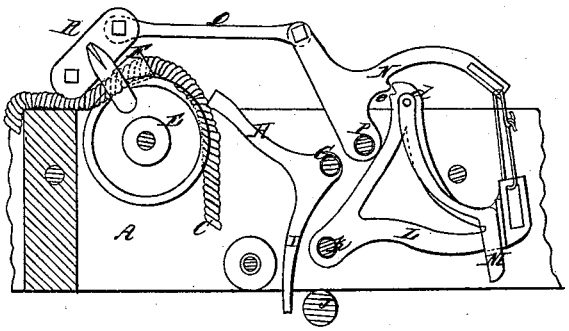

Figures 2 and 3, side views, in different positions, one side of the framework removed to show the mechanism.

This invention relates to an improvement in clutch for hay-elevator, for which Letters Patent were granted to me November 29, 1864, and reissued August 20, 1867; and consists in the peculiar arrangement of an automatic mechanism, whereby the apparatus is held in a fixed position until at such times as it is desired to be removed; then the said apparatus acts to release and permit its removal.

In order to the clear understanding of my improvement, I will proceed to describe the same, as illustrated in the accompanying drawings.

A is a framework, of any convenient form or construction, arranged so as to traverse upon a track, and supported thereon by wheels B. The fork, hook, or attaching apparatus is fixed to the end C of a rope or chain. The other end D, passing over the pulley E, arranged in the frame A, is carried off to any desired point, guided by other pulleys, and to their end the power is applied for raising the weight. On the said rope, at a proper point relative to the distance to which the material or article to be raised, is fixed a stop, F, and in the framework A, on a pivot G, is arranged a pawl, H, which, when the weight has been raised to the required height, will fall down behind the stop F, as denoted in figs. 1 and 2, and there hold the weight suspended. From this point the framework is caused to traverse upon its track until it reaches the destined point for the discharge of the article or material raised. Arriving at that point, the material is discharged in any convenient manner. Then the apparatus is caused to return, and, as it approaches the point from which the material is to be raised, a lever, I, upon the pawl H, strikes a stop, J, arranged in the proper relative position, and so as to raise the pawl, as denoted in red, fig. 3, and permit the descent of the rope, with the fork or apparatus attached thereto. Thus far the invention is shown in my original patent.

Upon a pivot, K, I arrange a lever, L, to one arm of which, at $d$, another lever, M, is pivoted, so that, as the apparatus approaches the stop J, the lever M will pass freely over, as denoted in red; and when so passed over, falling behind the stop into the position in black, will prevent the movement of the framework from that position, so long as the lever M bears against the said stop. But when the lever M is raised to the position denoted in fig. 3, then the apparatus may pass freely over the stop J, to carry the material raised to the desired point. And to automatically raise the said lever, I arrange another lever, N, upon the pivot P, and from one arm of which a connecting-rod, Q, is attached to a yoke, R, over the pulley E, and attached to the pulley or the framework, in such relative position thereto that it will maintain the same relative distance from the periphery of the said pulley, and so as to permit the free passage of the rope therethrough, but not to permit the passage of the stop F, so that, as the rope is drawn up, the stop F will strike the said yoke, as denoted in fig. 2, and carry it over to the position denoted in fig. 3.

From the other arm of the lever N, I form a flexible connection to the lever L, as denoted in figs. 2 and 3. It will be noticed that when the levers N and L are dropped or free they lock together at $e$, so that any pressure against the lever M cannot raise the lever L from its position; but the flexible connection permits the lever N to first rise from the notch $e$, and then raises the lever L, (and the lever M attached thereto,) as denoted in fig. 3; and when the yoke R is freed from the pressure of the stop F, then the levers L and M return to the position denoted in fig. 2.

I prefer to arrange the stop J so that, while it answers to operate the pawl H, it at the same time serves the purpose of holding the apparatus in a fixed position, the lever M passing over and dropping behind the said stop, as before described.

Thus I have arranged an apparatus operating automatically, which fixes itself in the desired position, and also, at the proper time, releases itself, so as to be removed therefrom.

Having thus fully described my invention, what I claim as new and useful, and desire to secure by Letters Patent, is—

1. The arrangement described, of the levers L and N, with the yoke R and pulley E, when constructed so as to operate in the manner and for the purpose substantially as set forth.

2. The combination of the levers L, M, and N, when constructed so as to operate as and for the purpose specified.

N. D. HINMAN.

Witnesses:
    JOHN E. EARLE,
    A. J. TIBBITS.